(12) United States Patent
Gaffrey et al.

(10) Patent No.: US 10,277,932 B2
(45) Date of Patent: Apr. 30, 2019

(54) CROWDSOURCED VOTING VIA INTERACTION BETWEEN CROWDSOURCE CLIENT AND CROWDSOURCED CLIENT INTERFACE

(71) Applicant: Intel Corporation, Santa Clara, CA (US)

(72) Inventors: John Gaffrey, Hillsboro, OR (US); Glen J. Anderson, Beaverton, OR (US); Meng Shi, Hillsboro, OR (US); Therese E. Dugan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/659,764

(22) Filed: Jul. 26, 2017

(65) Prior Publication Data

US 2019/0037259 A1    Jan. 31, 2019

(51) Int. Cl.
*H04N 21/25* (2011.01)
*H04N 21/234* (2011.01)
*H04N 21/2187* (2011.01)
*H04N 21/475* (2011.01)

(52) U.S. Cl.
CPC ....... *H04N 21/252* (2013.01); *H04N 21/2187* (2013.01); *H04N 21/23424* (2013.01); *H04N 21/4758* (2013.01)

(58) Field of Classification Search
CPC .......... H04N 21/252; H04N 21/23424; H04N 21/2187; H04N 21/4758; H04N 21/472
See application file for complete search history.

(56) References Cited

U.S. PATENT DOCUMENTS

2007/0113259 A1* 5/2007 Hookham-Miller ........................ H04N 7/17345 725/132
2014/0282650 A1* 9/2014 Viles ................ H04N 21/23424 725/13

* cited by examiner

*Primary Examiner* — Benjamin R Bruckart
*Assistant Examiner* — Tien M Nguyen
(74) *Attorney, Agent, or Firm* — Jordan IP Law, LLC

(57) ABSTRACT

Systems, apparatuses, and methods may provide for technology to conduct contemporaneous crowd-sourced voting via interaction between a client and a client interface.

20 Claims, 7 Drawing Sheets

CROWDSOURCED VOTING VIA INTERACTION BETWEEN CROWDSOURCE CLIENT AND CROWDSOURCED CLIENT INTERFACE

FIELD OF INVENTION

Embodiments relate generally to contemporaneous crowd-sourced voting via interaction between a client and a client interface.

BACKGROUND OF THE DESCRIPTION

Contemporaneous voting during live streaming of television (TV) content gives an advantage to live TV and streaming overtime-delayed viewing. Live viewing has provided the digital media content provider the opportunity to "synch" its viewership in order that people can talk about the latest episode. Some TV shows for children may have toys and play settings that correspond to characters and spaces in media.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described to avoid obscuring the present invention.

Figure 1:
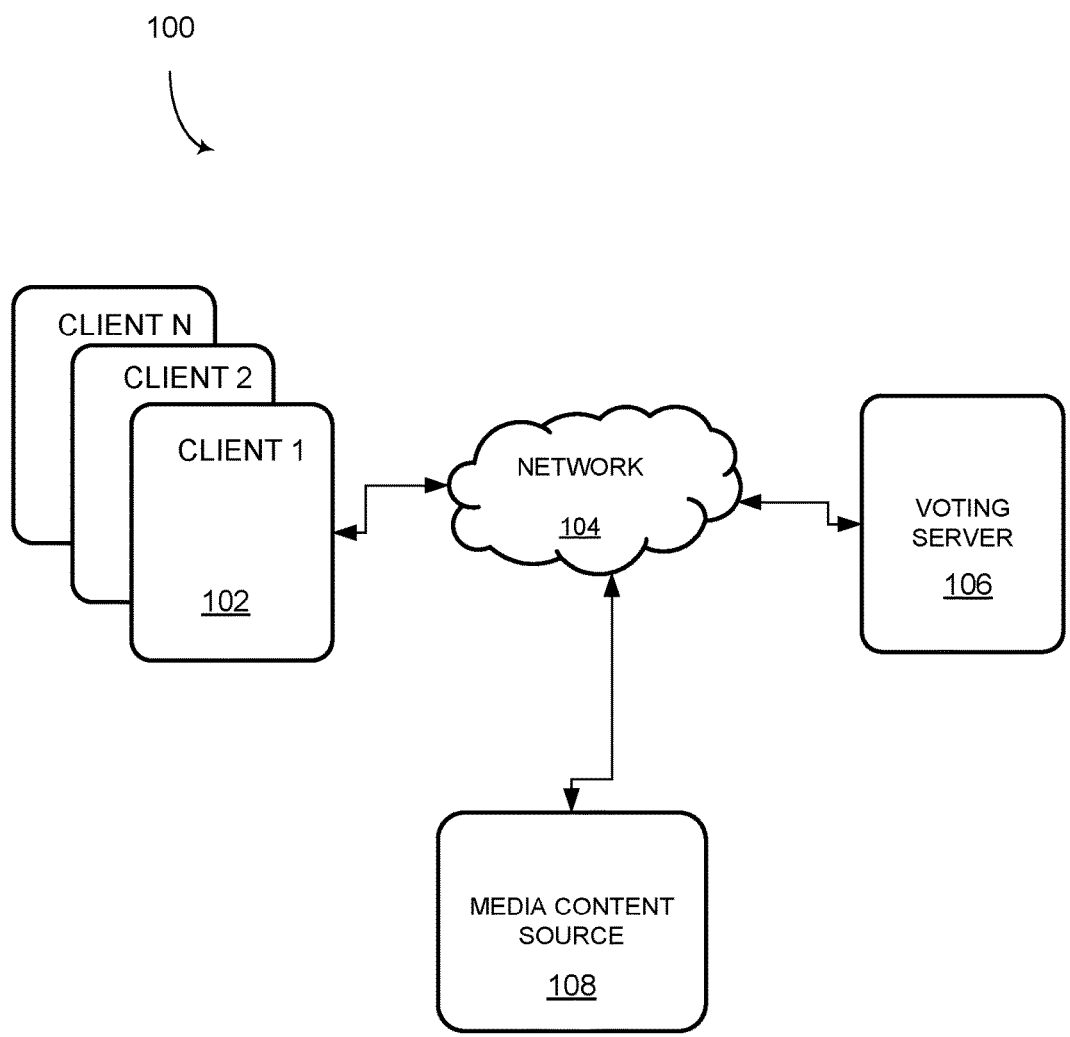
FIG. 1 illustrates an example of a crowdsourced voting system, according to an embodiment.

FIG. 1 illustrates a cloud system 100 that includes a cloud voting server 106 configured, for example, to receive crowdsourced voting data, store such crowdsourced voting data in memory, compile the crowdsourced voting data, and send the compiled crowdsourced voting data via a network 104 to a media content source 108 for purposes of modifying the media content viewed contemporaneously by a plurality of client users 102.

The client users 102, each having a corresponding client interface (See, FIGS. 2 and 3) in connection to a corresponding crowdsourced computing device (See, FIGS. 2 and 3) for use during a contemporaneous broadcast of media content by the media content source 108. The crowdsourced computing device and/or the client interface may be embodied as a computing device, including, but not limited to, desktop computers, laptop computers, smart phones, hand-held personal computers, workstations, game consoles, cellular phones, mobile devices, wearable computing devices, tablet computers, convertible tablet computers, or any other electronic, microelectronic, or micro-electromechanical device for processing and communicating data. The client interface and/or the crowdsourced computing device may be operatively connected to a display configured to display digital content from a media content source, such as, for example, a digital content provider 108. The client interface and/or the crowdsourced computing device may be embodied as a children's play toy, toy figurine, doll, playset(s), and any combination thereof.

In accordance with embodiment, the client users 102, while viewing content from the media content source, may simultaneously interact with a respective client interface, and "vote" for how they want modify, contemporaneously or at a later date, the media content displayed. For example, a certain interaction by a client user 102 relative to the client interface and space interface may result in a modification in the story displayed in a live broadcast or stream. Crowdsourced data from client users having the same toys, toy figurines, toy sets, etc. may influence a broadcast program through "voting with toys."

Groupings or actions of the toys, changes of clothes, or changes to the play spaces may indicate a desired outcome of a scene (e.g., upcoming content, the type of attire/clothing a character should wear during a scene, a character's favorite color, character to become leader, etc.). Additionally, specific gestures, voice commands, and physical interactions by the client user with a client interface may activate and answer different types of queries, in addition to voting on certain aspects of the media content.

Different sequencing of multiple toys, dolls, or accessories that relate to the media content may add more value to each vote. For example, if a client user owns all the character toy figurines for a specific show, and line them up in a specified predetermined sequence, then the vote may be weighed more than when just having one character toy figurine in the series. A client user 102 may also unlock different sequences through trial and error (and play patterns) to also add value to a vote.

Figure 2:
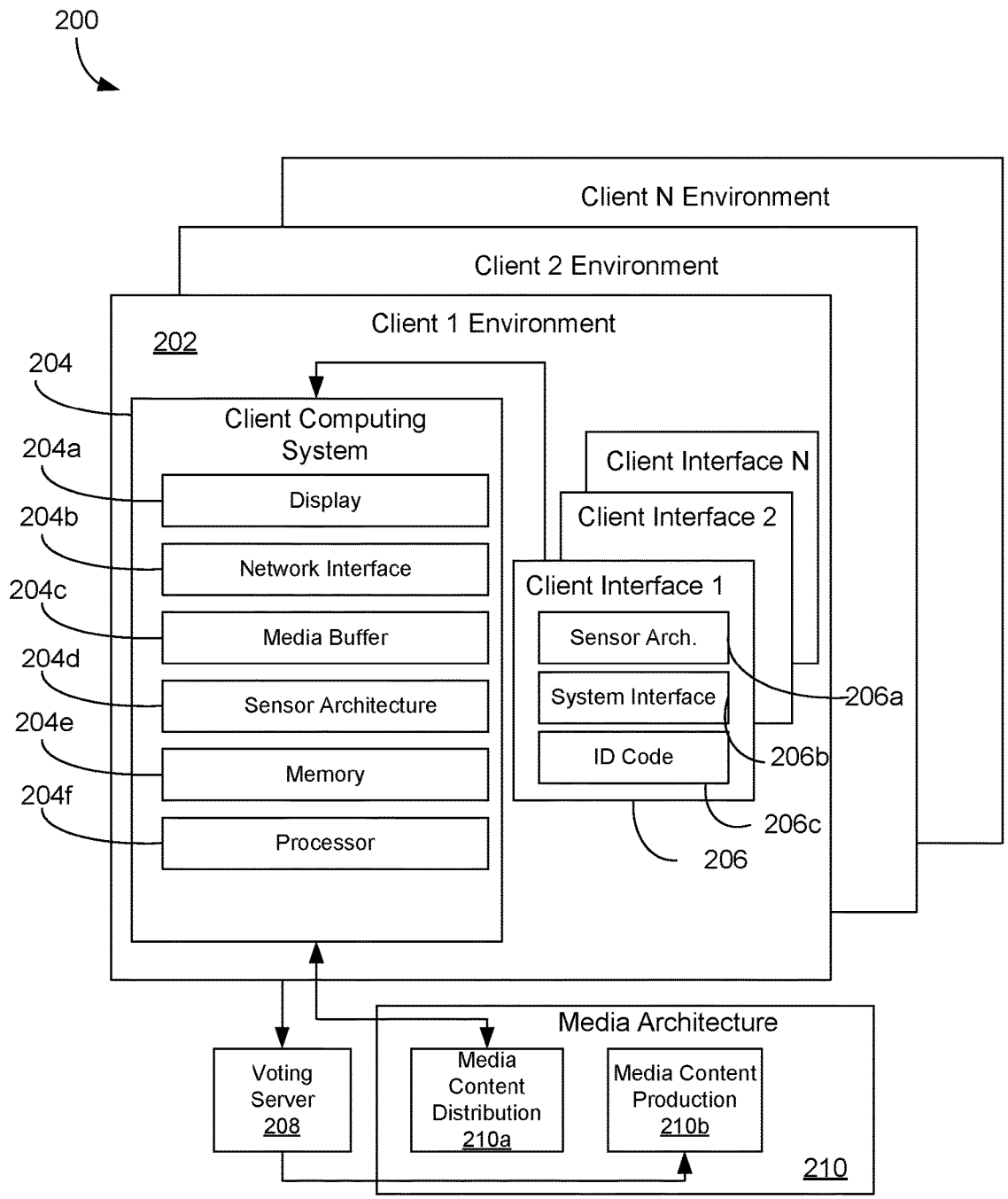
FIG. 2 illustrates a block diagram of an example of a computing system, according to an embodiment.

FIG. 2 illustrates a crowdsource voting system 200 that may comprise a client environment 202 that includes a client computing system 204 operatively connected to a client interface 206, and a cloud voting server 206 operatively connected between the client computing system 204 and media architecture 210.

The client interface 206 may include sensor architecture 206a, a computer system interface 206b and an ID code 206c. The sensor architecture 206a may comprise, for example, a sensor array that may be include one or more of: an image device (e.g., camera (RGB, depth, 3D, etc.)), audio device (e.g., microphone), or devices to detect/capture/measure motion, direction, and proximity (including NFC/RFID, optical, Reed switch, capacitance, etc.), chemical, pressure, and any combination thereof.

The client computing system 204 may include, for example, a display 204a (e.g., fixed or head mounted liquid crystal display/LCD, light emitting diode/LED display, etc.) to display media content, a network interface 204b, a media buffer 204c, sensor architecture 204d to measure/detect/capture an interaction between the client user and the client interface, memory 204e (e.g., DRAM), and a processor 204f.

The sensor architecture 204d may comprise, for example, a sensor array that may be include one or more of: an image device (e.g., camera (RGB, depth, 3D, etc.)), audio device (e.g., microphone), or devices to detect/capture/measure motion, direction, and proximity (including NFC/RFID, optical, Reed switch, capacitance, etc.), chemical, pressure, and any combination thereof.

In accordance with embodiments, the sensor architecture 204d and/or 206a may be configured to detect/capture/measure a visual, vocal, and/or physical command or interaction between a client user 102 and a corresponding client interface 206 in response to a query in connection with a display of contemporaneous media content by the media content source. Such an interaction may, for example, serve to influence a broadcast program by the media content source.

The processor 204f may comprise a semiconductor package apparatus having a substrate, and logic coupled to the substrate, the logic being implemented in one or more of configurable logic or fixed-functionality hardware logic. The processor 204f may include control architecture that performs one or more aspects of the method 500 (FIG. 5), and/or the method 600 (FIG. 6), and/or the method 700 (FIG. 7). In accordance with embodiments, the logic is to detect, from each crowdsourced computing device, and in response to a display of contemporaneous media content by a media content source having media architecture 210, an interaction between the client interface 206 and a client in response to a query, interpret the detected interaction as a crowdsourced vote in response to the query, and compile the crowdsourced votes, and send, over a computer network (as illustrated in FIG. 1), a signal representing the compiled crowdsourced votes to the media content source having media architecture 210. In that way, the media content may be modified (contemporaneously or asynchronously) in response to the compiled votes.

The client environment 202, particularly the client computing system 204, may be operatively connected to a cloud voting server 208. The client voting server 208 may be configured, for example, to receive, store, execute, compile, and transmit voting data relative to a query in connection with a display of contemporaneous media content by a media content source having media architecture 210 that includes media content distribution 210a and media content production 210b which is operatively connected to the cloud voting server 208. Upon interpretation of the detected interaction (e.g., a visual, vocal, and/or physical command or interaction) by the client computing system 204 for purposes of crowdsourced voting, and compilation of the crowdsourced voting by the cloud voting server 208, the cloud voting server 208 is to send the compiled voting data to the media content production 210b so that the media content viewed by the client users may be modified (either contemporaneously or asynchronously) in response to the compiled votes.

Figure 3:
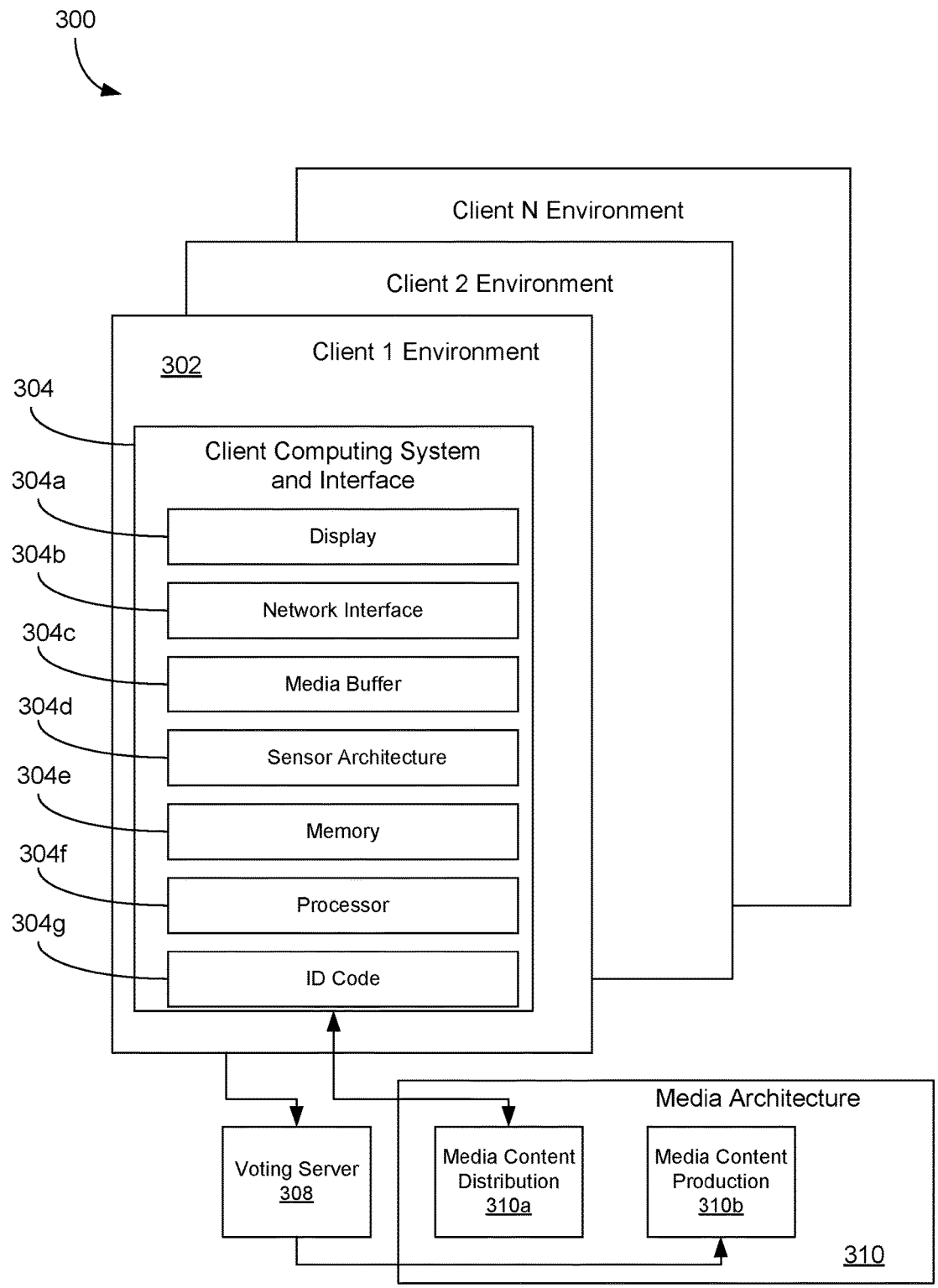
FIG. 3 illustrates a block diagram of an example of a computing system, according to an embodiment.

FIG. 3 illustrates an embodiment of a crowdsource voting system 300 that may comprise a client environment 302 that includes a client computing system and interface 304, and a cloud voting server 308 operatively connected between the client computing system and interface 304 and media architecture 310.

The client computing system and interface 304, may include, for example, a display 304a (e.g., fixed or head mounted liquid crystal display/LCD, light emitting diode/LED display, etc.) to display media content, a network interface 304b, a media buffer 304c, sensor architecture 304d to measure/detect/capture interaction (e.g., a gesture, vocal command, physical interaction, etc.) between the client user and the client interface, memory 304e (e.g., DRAM), a processor 304f, and an ID code 304g.

The sensor architecture 304d may comprise, for example, a sensor array that may be include one or more of: an image device (e.g., camera (RGB, depth, 3D, etc.)), audio device (e.g., microphone), or devices to detect/capture/measure motion, direction, and proximity (including NFC/RFID, optical, Reed switch, capacitance, etc.), chemical, pressure, and any combination thereof.

In accordance with embodiments, the sensor architecture 304d may be configured to detect/capture/measure a visual, vocal, and/or physical command or interaction between a client user 102 and a corresponding client computing system and interface 304 in response to a query in connection with a display of contemporaneous media content by the media content source. Such an interaction may, for example, serve to influence a broadcast program by the media content source.

The processor 304f may comprise a semiconductor package apparatus having a substrate, and logic coupled to the substrate, the logic being implemented in one or more of configurable logic or fixed-functionality hardware logic. The processor 304f may include control architecture that performs one or more aspects of the method 500 (FIG. 5), and/or the method 600 (FIG. 6), and/or the method 700 (FIG. 7), and/or the method 800 (FIG. 8). In accordance with embodiments, the logic is to detect, from each crowdsourced computing device, and in response to a display of contemporaneous media content by a media content source having media architecture 310, an interaction between the client computing system and interface 304 and a client in response to a query, interpret the detected interaction as a crowdsourced vote in response to the query, and compile the crowdsourced votes, and send, over a computer network (as illustrated in FIG. 1), a signal representing the compiled crowdsourced votes to the media content source having media architecture 310. In that way, the media content may be modified (contemporaneously or asynchronously) in response to the compiled votes.

Figure 4:
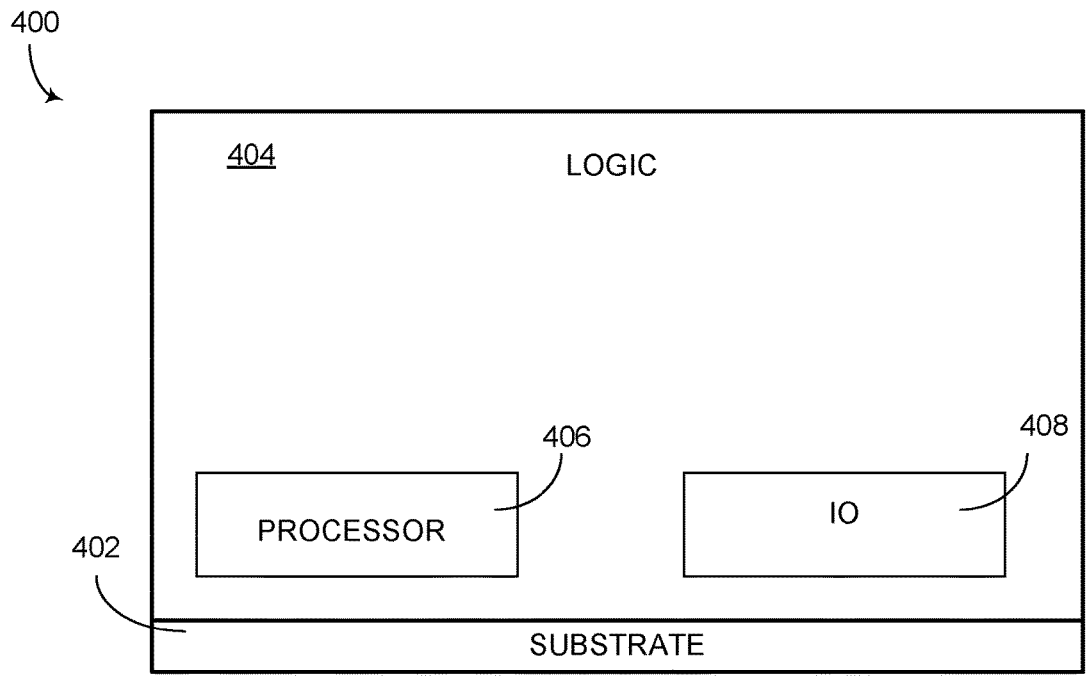
FIG. 4 illustrates a block diagram of an example of an apparatus, according to an embodiment.

The client environment 302, particularly the client computing system and interface 304, may be operatively connected to a cloud voting server 308 configured, for example, to receive, store, execute, compile, and transmit voting data relative to a query in connection with a display of contemporaneous media content by a media content source having media architecture 310 that includes media content distribution 310a and media content production 310b which is operatively connected to the cloud voting server 308. Upon interpretation of the detected interaction (via a gesture, vocal command, physical interaction, etc.) by the client computing system and interface 304 for purposes of crowdsourced voting, and compilation of the crowdsourced voting by the cloud voting server 308, the cloud voting server 308 is to send the compiled voting data to the media content production 310b so that the media content viewed by the client users may be modified (contemporaneously or asynchronously) in response to the compiled votes FIG. 4 illustrates a diagram of a computing apparatus 400 (e.g., chip) that includes a substrate 402 (e.g., silicon, sapphire, gallium arsenide) and logic 404 (e.g., transistor array and other integrated circuit/IC components) operatively coupled to the substrate 402. The logic 404, which may be implemented in configurable logic and/or fixed-functionality logic hardware, includes a processor 406, and an IO module 408. The logic 404 may generally implement one or more aspects of the method 500 (FIG. 5), and/or the method 600 (FIG. 6), and/or the method 700 (FIG. 7), and/or the method 800 (FIG. 8). Thus, the logic 404 may be configured to detect, in response to a display of contemporaneous media content by a media content source, an interaction between a client interface and a client in response to a query. The logic 404 may also be configured to interpret the detected interaction as a crowdsourced vote in response to the query. The logic 404 may further be configured to send, over a computer network, a signal representing the crowdsourced vote to the media content source to thereby modify the media content in response to a compilation of crowdsourced votes.

Figure 5:
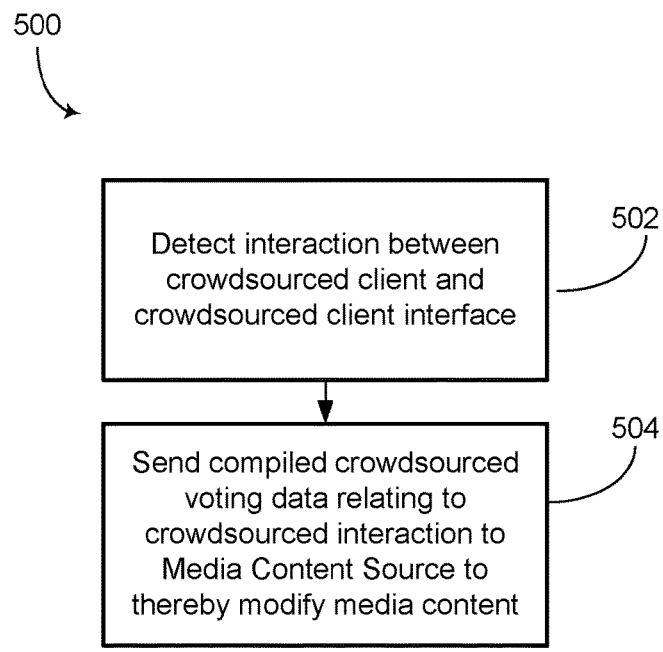
FIGS. 5-7 illustrates flowcharts examples of methods of conducting crowdsourced voting, according to embodiments.
Figure 6:
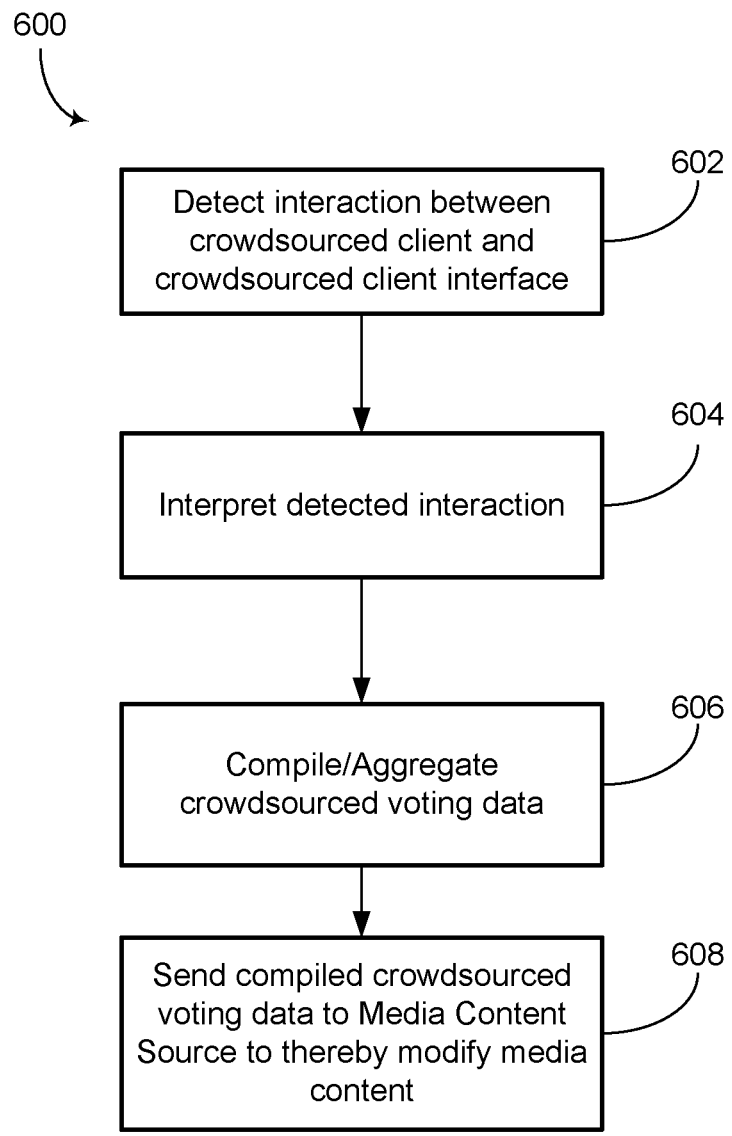
Figure 7:
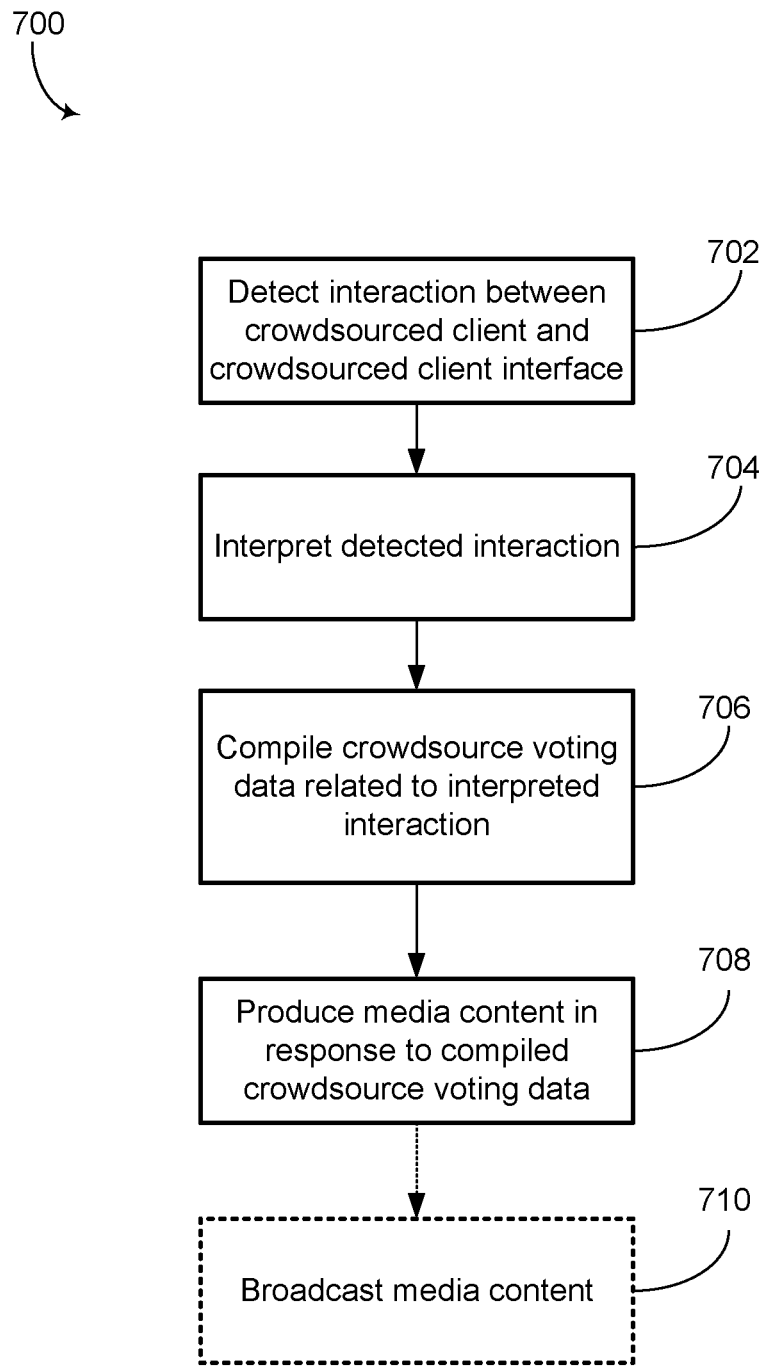
Figure 8:
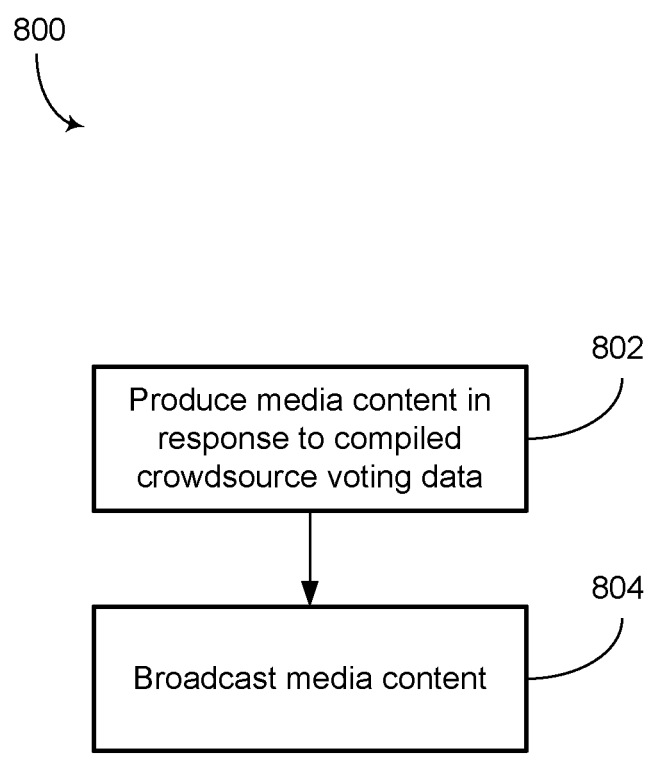
FIG. 8 illustrates a flowchart of an example of a method of producing media content production via contemporaneous crowdsourced voting, according to an embodiment.

FIGS. 5 to 7 respectively illustrate methods of conducting crowdsourced voting, according to embodiments. The methods 500, 600, and 700 may generally be implemented in the computing system 200, 300 illustrated in FIGS. 2 and 3, and/or the computing apparatus 400 illustrated in FIG. 4, and which are respectively described herein. In particular, the respective methods 500, 600, 700, and 800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods 500, 600, and 700 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

As illustrated in the method 500, illustrated processing block 502 provides for detecting an interaction between a client interface and a client, in response to a display of contemporaneous media content by a media content source and a query from the displayed contemporaneous media content. Such a client may, for example, be part of a plurality of clients who are contemporaneously viewing the media content.

Illustrated processing block 504 provides for interpreting the detected interaction as a crowdsourced vote in response to the query, and compiling the crowdsourced votes.

Illustrated processing block 506 provides for sending, over a computer network, a signal representing the compiled crowdsourced votes to the media content source to thereby modify the media content in response to the compiled votes.

As illustrated in the method 600, illustrated processing block 602 provides for detecting an interaction between a client interface and a client, in response to a display of contemporaneous media content by a media content source and a query from the displayed contemporaneous media content. Such a client may, for example, be part of a plurality of clients who are contemporaneously viewing the media content.

Illustrated processing block 604 provides for interpreting the detected interaction as a crowdsourced vote in response to the query, and compiling the crowdsourced votes.

Illustrated processing block 606 provides for sending (e.g., over a computer network), a signal representing the compiled crowdsourced votes to the media content source to thereby modify the media content in response to the compiled crowdsourced votes.

As illustrated in the method 700, illustrated processing block 702 provides for detecting an interaction between a client interface and a client, in response to a display of contemporaneous media content by a media content source and a query from the displayed contemporaneous media content. Such a client may, for example, be part of a plurality of clients who are contemporaneously viewing the media content.

Illustrated processing block 704 provides interpreting the detected interaction as a crowdsourced vote in response to the query.

Illustrated processing block 706 provides for compiling the crowdsourced voting data relating to the interpreted interaction.

Illustrated processing block 708 may also provide for broadcasting the media content in response to the media content being produced in accordance with compiled crowdsource voting data.

As illustrated in the method 800, illustrated processing block 802 provides for producing, in response to a compiled crowdsource voting data based upon a detected and interpreted interaction between a client interface and a client. The interaction may be in response to a display of contemporaneous media content by a media content source and a query from the displayed contemporaneous media content. Such a client may, for example, be part of a plurality of clients who are contemporaneously viewing the media content.

Illustrated processing block 804 provides for broadcasting the media content in response to the media content being produced in accordance with compiled crowdsource voting data.

Additional Notes and Examples

Example 1 may include a crowdsource voting system, comprising a plurality of client interfaces for use by a corresponding client user, a computing device operatively connected to a corresponding client interface, the computing device including a semiconductor package apparatus having a substrate, and logic coupled to the substrate, wherein the logic is implemented in one or more of configurable logic or fixed-functionality hardware logic, the logic to detect, an interaction between the client interface and the client user, in response to a display of contemporaneous media content by a media content source and a query from the displayed contemporaneous media content, interpret the detected interaction as a crowdsourced vote in response to the query, and send, over a computer network, a signal representing crowdsourced voting data to the media content source to thereby modify the media content in response to a compilation of the crowdsourced voting data.

Example 2 may include the crowdsource voting system of Example 1, wherein the interaction is to indicate a desired outcome of a scene in the media content.

Example 3 may include the crowdsource voting system of Example 1, wherein the client interface comprises at least one of a play toy, a toy figurine, a doll, and a playset.

Example 4 may include the crowdsource voting system of Example 3, wherein the interaction comprises a physical interaction between one of the client users and the corresponding at least one of the play toy, the toy figurine, the doll, and the playset.

Example 5 may include the crowdsource voting system of Example 3, wherein the interaction comprises a vocal interaction between one of the client users and the corresponding at least one of the play toy, the toy figurine, the doll, and the playset.

Example 6 may include the crowdsource voting system of any one of Examples 1 to 5, wherein the interaction comprises a visual interaction between one of the client users and the corresponding at least one of the play toy, the toy figurine, the doll, and the playset.

Example 7 may include a semiconductor package apparatus, comprising a substrate, logic coupled to the substrate, wherein the logic is at least partially implemented in one or more of configurable logic or fixed-functionality hardware logic, the logic to detect an interaction between a client interface and a client user, in response to a display of contemporaneous media content by a media content source and a query from the displayed contemporaneous media content, interpret the detected interaction as a crowdsourced vote in response to the query, and send, over a computer network, a signal representing crowdsourced voting data to the media content source to thereby modify the media content in response to a compilation of the crowdsourced voting data.

Example 8 may include the semiconductor package apparatus of Example 7, wherein the interaction is to indicate a desired outcome of a scene in the media content.

Example 9 may include the semiconductor package apparatus of Example 7, wherein the client interface comprises at least one of a play toy, a toy figurine, a doll, and a playset.

Example 10 may include the semiconductor package apparatus of Example 9, wherein the interaction comprises a physical interaction between one of the client users and the corresponding at least one of the play toy, the toy figurine, the doll, and the playset.

Example 11 may include the semiconductor package apparatus of Example 9, wherein the interaction comprises a vocal interaction between one of the client users and the corresponding at least one of the play toy, the toy figurine, the doll, and the playset.

Example 12 may include the semiconductor package apparatus of any one of Examples 7 to 11, wherein the interaction comprises a visual interaction between one of the client users and the corresponding at least one of the play toy, the toy figurine, the doll, and the playset.

Example 13 may include a method of crowdsourced voting, comprising detecting an interaction between a client interface and a client user, in response to a display of contemporaneous media content by a media content source and a query from the displayed contemporaneous media content, interpreting the detected interaction as a crowdsourced vote in response to the query, and compiling the crowdsourced votes, and sending, over a computer network, a signal representing crowdsourced voting data to the media content source to thereby modify the media content in response to a compilation of the crowdsourced voting data.

Example 14 may include the method of Example 13, wherein the interaction is to indicate a desired outcome of a scene in the media content.

Example 15 may include the method of Example 13, wherein the client interface comprises at least one of a play toy, a toy figurine, a doll, and a playset.

Example 16 may include the method of Example 15, wherein the interaction comprises a physical interaction between one of the client users and the corresponding at least one of the play toy, the toy figurine, the doll, and the playset.

Example 17 may include the method of Example 15, wherein the interaction comprises a vocal interaction between one of the client users and the corresponding at least one of the play toy, the toy figurine, the doll, and the playset.

Example 18 may include the method of any one of Examples 13 to 17, wherein the interaction comprises a visual interaction between one of the client users and the corresponding at least one of the play toy, the toy figurine, the doll, and the playset.

Example 19 may include at least one computer readable medium, comprising a set of instructions, which when executed by a processor of a computing device, cause the computing device to detect, an interaction between a client interface and a client user, in response to a display of contemporaneous media content by a media content source and a query from the displayed contemporaneous media content, interpret the detected interaction as a crowdsourced vote in response to the query, and send, over a computer network, a signal representing crowdsourced voting data to the media content source to thereby modify the media content in response to a compilation of the crowdsourced voting data.

Example 20 may include the at least one computer readable medium of Example 19, wherein the interaction is to indicate a desired outcome of a scene in the media content.

Example 21 may include the at least one computer readable medium of Example 19, wherein the client interface comprises at least one of a play toy, a toy figurine, a doll, and a playset.

Example 22 may include the at least one computer readable medium of Example 21, wherein the interaction comprises a physical interaction between one of the client users and the corresponding at least one of the play toy, the toy figurine, the doll, and the playset.

Example 23 may include the at least one computer readable medium of Example 21, wherein the interaction comprises a vocal interaction between one of the client users and the corresponding at least one of the play toy, the toy figurine, the doll, and the playset.

Example 24 may include the at least one computer readable medium of any one of Examples 19 to 23, wherein the interaction comprises a visual interaction between one of the client users and the corresponding at least one of the play toy, the toy figurine, the doll, and the playset.

Example 25 may include a semiconductor package apparatus, comprising means to detect an interaction between a client interface and a client user, in response to a display of contemporaneous media content by a media content source and a query from the displayed contemporaneous media content, means to interpret the detected interaction as a crowdsourced vote in response to the query, and means to send, over a computer network, a signal representing crowdsourced voting data to the media content source to thereby modify the media content in response to a compilation of the crowdsourced voting data.

Example 26 may include the semiconductor package apparatus of Example 25, wherein the interaction is to indicate a desired outcome of a scene in the media content.

Example 27 may include the semiconductor package apparatus of Example 25, wherein the client interface comprises at least one of a play toy, a toy figurine, a doll, and a playset.

Example 28 may include the semiconductor package apparatus of Example 27, wherein the interaction comprises a physical interaction between one of the client users and the corresponding at least one of the play toy, the toy figurine, the doll, and the playset.

Example 29 may include the semiconductor package apparatus of Example 27, wherein the interaction comprises a vocal interaction between one of the client users and the corresponding at least one of the play toy, the toy figurine, the doll, and the playset.

Example 30 may include the semiconductor package apparatus of any one of Examples 25 to 29, wherein the interaction comprises a visual interaction between one of the client users and the corresponding at least one of the play toy, the toy figurine, the doll, and the playset.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one."

As used in this application and in the claims, a list of items joined by the term "one or more of" may mean any combination of the listed terms. For example, the phrases "one or more of A, B or C" may mean A, B, C; A and B; A and C; B and C; or A, B and C.

The embodiments have been described above with reference to specific embodiments. Persons skilled in the art, however, will understand that various modifications and changes may be made thereto without departing from the broader spirit and scope of the embodiments as set forth in the appended claims. The foregoing description and drawings are, accordingly, to be regarded in an illustrative rather than a restrictive sense.

What is claimed is:

1. A crowdsource voting system, comprising:
   a plurality of client interfaces for use by a corresponding client user, wherein the client interfaces comprise a tangible play toy, or a tangible toy figurine, or a tangible doll, or a tangible playset;
   a computing device operatively connected to the client interfaces, the computing device including a semiconductor package apparatus having:
   a substrate,
   sensor architecture to detect an interaction between the client interfaces and the client user in response to a display of contemporaneous media content being broadcast by a media content source and a query from the displayed contemporaneous media content, and
   logic coupled to the substrate, wherein the logic is implemented in one or more of configurable logic or fixed-functionality hardware logic, the logic to:
   interpret a detected interaction as a crowdsourced vote in response to the query, wherein a value of the crowdsourced vote is weighed based on a grouping of the client interfaces by the client user in a specified predetermined sequence for a specific content; and
   send, over a computer network, a signal representing crowdsourced voting data to be compiled;
   a cloud voting server, operatively connected to the computing device via the computer network, to receive the crowdsourced voting data from a plurality of client users, compile the crowdsourced voting data, and send, via the computer network, the compiled crowdsourced voting data to the media content source to thereby modify the media content in response to the compiled crowdsourced voting data.

2. The crowdsource voting system of claim 1, wherein the interaction is to indicate a desired outcome of a scene in the media content.

3. The crowdsource voting system of claim 1, wherein the interaction comprises a physical interaction between the client user and the corresponding tangible play toy, tangible toy figurine, tangible doll, and tangible playset.

4. The crowdsource voting system of claim 1, wherein the interaction comprises a vocal interaction between the client user and the corresponding tangible play toy, tangible toy figurine, tangible doll, and tangible playset.

5. The crowdsource voting system of claim 1, wherein the interaction comprises a visual interaction between the client user and the corresponding tangible play toy, tangible toy figurine, tangible doll, and tangible playset.

6. A semiconductor package apparatus, comprising:
   a substrate;
   sensor architecture to detect an interaction between a plurality of client interfaces and a client user in response to a display of contemporaneous media content being broadcast by a media content source and a query from the displayed contemporaneous media content, wherein the client interfaces include a tangible play toy, or a tangible toy figurine, or a tangible doll, or a tangible playset; and
   logic coupled to the substrate, wherein the logic is at least partially implemented in one or more of configurable logic or fixed-functionality hardware logic, the logic to:
   interpret the a detected interaction as a crowdsourced vote in response to the query, wherein a value of the crowdsourced vote is weighed based on a grouping of the client interfaces by the client user in a specified predetermined sequence for a specific content; and
   send, over a computer network, a signal representing crowdsourced voting data to a cloud voting server for a compilation of the crowdsourced voting data from a plurality of client users, the compiled crowdsourced voting data to be sent to the media content source to thereby modify the media content in response to the compiled crowdsourced voting data.

7. The semiconductor package apparatus of claim 6, wherein the interaction is to indicate a desired outcome of a scene in the media content.

8. The semiconductor package apparatus of claim 6 wherein the interaction comprises a physical interaction between the client user and the corresponding tangible play toy, tangible toy figurine, tangible doll, and tangible playset.

9. The semiconductor package apparatus of claim 6 wherein the interaction comprises a vocal interaction between the client user and the corresponding tangible play toy, tangible toy figurine, tangible doll, and tangible playset.

10. The semiconductor package apparatus of claim 6 wherein the interaction comprises a visual interaction between the client user and the corresponding tangible play toy, tangible toy figurine, tangible doll, and tangible playset.

11. A method of crowdsourced voting, comprising:
   detecting an interaction between a plurality of client interfaces and a client user, in response to a display of contemporaneous media content being broadcast by a media content source and a query from the displayed contemporaneous media content, wherein the client interfaces include a tangible play toy, or a tangible toy figurine, or a tangible doll, or a tangible playset;

interpreting the detected interaction as a crowdsourced vote in response to the query, wherein a value of the crowdsourced vote is weighed based on a grouping of the client interfaces by the client user in a specified predetermined sequence for a specific content; and sending, over a computer network, a signal representing crowdsourced voting data to a cloud voting server for a compilation of the crowdsourced voting data from a plurality of client users, the compiled crowdsourced voting data to be sent to the media content source to thereby modify the media content in response to the compiled crowdsourced voting data.

12. The method of claim 11, wherein the interaction is to indicate a desired outcome of a scene in the media content.

13. The method of claim 11, wherein the interaction comprises a physical interaction between the client user and the corresponding tangible play toy, tangible toy figurine, tangible doll, and tangible playset.

14. The method of claim 11, wherein the interaction comprises a vocal interaction between the client user and the corresponding tangible play toy, tangible toy figurine, tangible doll, and tangible playset.

15. The method of claim 11, wherein the interaction comprises a visual interaction between the client user and the corresponding tangible play toy, tangible toy figurine, tangible doll, and tangible playset.

16. At least one non-transitory computer readable medium, comprising a set of instructions, which when executed by a processor of a computing device, cause the computing device to:

detect, an interaction between a plurality of client interfaces and a client user, in response to a display of contemporaneous media content being broadcast by a media content source and a query from the displayed contemporaneous media content, wherein the client interfaces include a tangible play toy, or a tangible toy figurine, or a tangible doll, or a tangible playset;

interpret the detected interaction as a crowdsourced vote in response to the query, wherein a value of the crowdsourced vote is weighed based on a grouping of the client interfaces by the client user in a specified predetermined sequence for a specific content; and send, over a computer network, a signal representing crowdsourced voting data to a cloud voting server for a compilation of the crowdsourced voting data from a plurality of client users, the compiled crowdsourced voting data to be sent to the media content source to thereby modify the media content in response the compiled crowdsourced voting data.

17. The at least one non-transitory computer readable medium of claim 16, wherein the interaction is to indicate a desired outcome of a scene in the media content.

18. The at least one non-transitory computer readable medium of claim 16, wherein the interaction comprises a physical interaction between the client user and the corresponding tangible play toy, tangible toy figurine, tangible doll, and tangible playset.

19. The at least one non-transitory computer readable medium of claim 16, wherein the interaction comprises a vocal interaction between the client user and the corresponding tangible play toy, tangible toy figurine, tangible doll, and tangible playset.

20. The at least one non-transitory computer readable medium of claim 16, wherein the interaction comprises a visual interaction between the client user and the corresponding tangible play toy, tangible toy figurine, tangible doll, and tangible playset.

* * * * *